United States Patent
Bubany et al.

(12) 
(10) Patent No.: US 9,491,178 B2
(45) Date of Patent: Nov. 8, 2016

(54) IDENTIFYING A MEASURE OF ONLINE SECURITY

(71) Applicant: FMR LLC, Boston, MA (US)

(72) Inventors: Lori Bubany, Boston, MA (US); Christopher Eastman, Boston, MA (US); Rohit Goel, Boston, MA (US); Arun Varghese, Boston, MA (US); Stephanie West, Boston, MA (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 14/622,646

(22) Filed: Feb. 13, 2015

(65) Prior Publication Data
US 2016/0241561 A1 Aug. 18, 2016

(51) Int. Cl.
*H04L 29/06* (2006.01)
*G06F 7/04* (2006.01)

(52) U.S. Cl.
CPC .................... *H04L 63/102* (2013.01)

(58) Field of Classification Search
CPC ....................................... H04L 63/08
USPC ............................................. 726/3
See application file for complete search history.

(56) References Cited

U.S. PATENT DOCUMENTS

| | | | |
|---|---|---|---|
| 8,776,168 B1* | 7/2014 | Gibson | H04L 63/104 709/225 |
| 2013/0091052 A1* | 4/2013 | Kaperdal | G06Q 20/227 705/39 |
| 2014/0067650 A1* | 3/2014 | Gardiner | G06Q 40/025 705/38 |
| 2014/0172706 A1* | 6/2014 | Condry | G06Q 20/4016 705/44 |

* cited by examiner

*Primary Examiner* — Dant Shaifer Harriman
*Assistant Examiner* — Aubrey Wyszynski
(74) *Attorney, Agent, or Firm* — Fish & Richardson P.C.

(57) ABSTRACT

A computer-implemented method includes retrieving, by one or more processing devices and from one or more data repositories, user information; generating, based on the retrieved user information, a digital personal profile that is a composite of a set of pre-defined attributes; determining an aggregate strength of values of the set of pre-defined attributes in the digital personal profile; and generating, based on the determined aggregate strength, a digital security score that measures a level of online security of accessing resources over a computer network.

24 Claims, 7 Drawing Sheets

System and Browser

Review the checklist below to find quick and easy ways to improve your Aegis health score.

Here are some things we can check today.

It looks like you have resolved 5 out of 5 common problems. To help us protect your information, please follow the instructions below to resolve the rest.

* It looks like you are using Windows 7. This is a supported operating system, congratulations!

* It looks like you are using Chrome 28. Your browser is up to date, congratulations!

* Your username xyz-16-6789 looks like it may be social security number. Please click here to change your username to something more secure.

* Your password is up to date, congratulations!

* It looks like you are using McAfee. Good luck using an active antivirus!

About
(antivirus) can only estimate what your device and settings are. In general, please keep your device with all of your device manufacturer updates. If you have any questions about your specific device, you may contact it directly. Representatives.

FIG. 3

Account Features and Personal Information

Follow the checklist below to find quick and easy ways to enhance your online security.

These settings affect what actions we will notify you of.

Set these settings according to how you use Fidelity.com. Most settings should be left on, but advanced users may wish to disable alerts on some features they use frequently.

Password Change 
This is a notification we don't allow you to disable. It is important to know when your password has been changed, even if you're sure it was you who did it.

Physical Address Change 
This notification will occur when your physical address changes. We want to make sure that you didn't move without knowing it.

Email Address Change 
Immediate notification if there are changes to your email address.

Adding Debit Card 
Immediate notification for any cards added, updated, or removed from your account.

Adding Checkwriting 
Immediate notification if there are any changes to checkwriting settings.

IDENTIFYING A MEASURE OF ONLINE SECURITY

BACKGROUND

The Internet represents an insecure channel for exchanging information leading to a high risk of intrusion or fraud.

SUMMARY

In an embodiment of the techniques described herein, a computer-implemented method includes retrieving, by one or more processing devices and from one or more data repositories, user information; generating, based on the retrieved user information, a digital personal profile that is a composite of a set of pre-defined attributes; determining an aggregate strength of values of the set of pre-defined attributes in the digital personal profile; and generating, based on the determined aggregate strength, a digital security score that measures a level of online security of accessing resources over a computer network. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The actions include modifying the digital security score by a weighted amount that is specific to a user for whom the digital security score is generated. The digital security score is based on a set of sub-scores comprising a transaction history score that is a value indicative of a measure of a user's compliance with a system's rules, a monitoring and logging score that is a value indicative of compliance monitoring of the user's account and online interactions, a personal profile setup score that is a value indicative a quality of the user's digital personal profile, and a banking profile score that is value indicative of a quality of the user's interactions that are specific to a particular sector. The actions include determining that a value of one of the sub-scores falls within a predefined range that is indicative of an inadequate amount of security; and generating information indicative of one or more suggested actions to increase a value of the determined one of the sub-scores. The actions include determining a weighted amount to be applied to a sub-score, with the weighted amount specifying an importance of the sub-score relative to others of the sub-scores in generating the digital security score; and applying one or more weighted amounts to one or more of the sub-scores. Each of the sub-scores evaluates a strength of one or more of the pre-defined attributes by assigning a value to the pre-defined attribute, and wherein the method further comprises: for a sub-score: determining which of the pre-defined attributes is evaluated by the sub-score; evaluating the determined pre-defined attributes, based on contents of digital personal profile; based on evaluating, assigning a value to each of the pre-defined attributes; and generating a value for the sub-score by aggregating the values assigned to the pre-defined attributes for that sub-score. The actions include computing the transaction history score; computing the monitoring and logging score; computing the personal profile setup score; and computing banking profile score; wherein the generating the digital security score comprise aggregating the transaction history score, the monitoring and logging score, the personal profile setup score, and the banking profile score. The actions include determining that the digital security score is below a threshold value; and generating information indicative of one or more suggested actions to increase a value of the digital security score.

DETAILED DESCRIPTION

Figure 1:
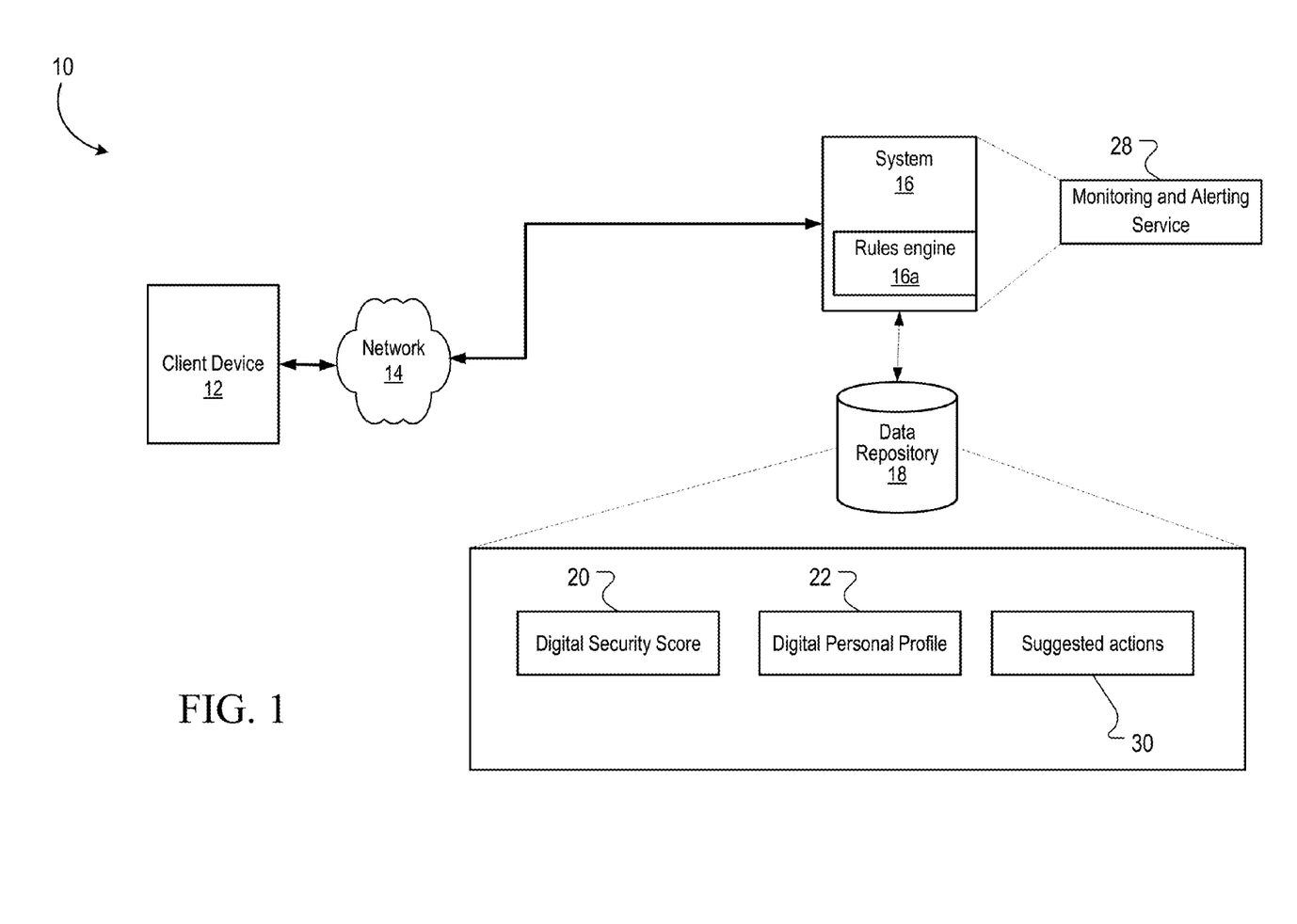
FIGS. 1 and 7 are block diagrams of a system for identifying a measure of online security.

Referring to FIG. 1, networked system 10 analyzes user behaviors and interactively suggests ways to increase online security of customer's transactions and interactions. Networked system 10 includes system 16 for transaction analysis, generation of a digital security score 20 and generation of suggested actions 30 to increase the digital security score. Generally, a digital security score is a measure of a level of online security of accessing resources over a computer network. For example, a digital security score includes a value indicative of a relative amount of security of a user's online accounts and transactions, relative to other users. There are various types of resources, including, e.g., websites, web pages, accounts, applications, and so forth.

Network system 10 also includes client device 12, network 14 and data repository 18. To promote online security, system 16 establishes a digital personal profile 22, executes a monitoring and alerting service 28, generates digital security score 22, and generates a visualization of the digital security score for display on client device 12 of a user. Generally, a digital personal profile is a composite of a set of pre-defined attributes for measuring a level of online security. For example, the pre-defined attributes include those attributes shown in the below tables 6, 8, 10 and 12. Each attribute may be evaluated across different dimensions (e.g., different criteria).

System 16 establishes digital personal profile 22 using information collected through a user's interaction with system. For example, certain information is required by law to open an account with a financial information and this required information is collected by system 16. System 16 collects additional information as customers execute transactions on their accounts. This collected information is stored in data repository 18. System 16 leverages this collected data and analyzes it to generate digital personal profiles for users.

To generate the digital personal profile 22, system 16 uses pre-defined types of data, including, e.g., the collected data types described above. In the event that some information is not available, system 16 prompts users on a one-time form when they log in to access their accounts. These pre-defined types of data include contact information, including home address, telephone number, email address, etc., information specifying a preferred contact method including trusted mobile and computing devices, information specifying a number and types of accounts on file, user behavior information including statistics on the frequency and amounts of transactions in a given period, information specification the location, IP address, and MAC address of trusted devices used to connect to a particular network, information about the device being used (to execute transactions or access accounts) including operating system updates, browser updates, and the presence of a trusted anti-virus, information specifying whether strong account credentials are used, such as not using an social security number to login to an account or having a recently updated password, information specifying the presence of beneficiary information for an account, information specifying recent interactions with an institution (e.g., an entity holding the accounts) through existing communication channels such as email, telephone, and investor centers, a log of recent or recurring problems such as locked accounts or forgotten passwords, information specifying personal preferences for monitoring and alerting, and information specifying a date one or more of the above-described types of information is updated.

System 16 also implements a monitoring and alerting service 28 by monitoring transactions, requests, and account changes on behalf of the customer. System 16 sends the customer notifications and alerts, in accordance with the customer's preferences, as described above. For example, one customer wants to be emailed, when system 16 detects unusual activity. Another customer wants to receive a telephone call, when system 16 detects unusual activity, e.g., an unusual increase in an amount of transactions or requests. System 16 monitors various different types of activities, including, e.g., receipts (funding sources) for inconsistent behavior, key account profile changes such as physical address, phone numbers, email, with emphasis on inconsistent demographics such as a phone number that is geographically disparate from the home address, transaction types, amounts, and frequencies based on the defined user profile and disbursements for new or modified behaviors such as changes to standing instructions.

System 16 periodically analyzes customer preferences and behaviors and uses an algorithm (described below) to generate digital security score 20. This score represents how secure a customer (or the customer's accounts and online transactions) is relative to his/her peers. Following generation of digital security score 20, system 16 transmits digital security score 20 (via network 14) to client device 12 for display in a graphical user interface on client device 12.

System 16 accesses from data repository 18 threshold information specifying a threshold value for digital security score 20. When digital security score 20 is below the threshold, system 16 analyzes low scoring subsections of score 20 and suggests behaviors to the users in the form of suggested actions 30 that prompt the user to action and will give a bonus to the user's score when completed. In this way, customers can work to improve their score over time, and therefore become more secure. System 16 includes rules engine 16a that applies rules to each of the collected attributes and/or subsections to calculate the suggestions.

System 16 generates digital security score 20 based on the following factors: information included in digital personal profile 22, results of execution of monitoring and alerting service 28, a risk rating as determined by activities and behaviors, an environmental modifier to account for systemic risk factors such as local instability or heightened criminal activity, and a bonus for recently completed suggested actions. Each of these factors corresponds to a subsection (i.e., a sub-score) in generating score 20.

Following generation of digital security score 20, system 16 transmits to client device 12 information for a graphical user interface that when rendered on client device 12 displays digital security score 20. Digital security score 20 is displayed to the customer in a variety of ways, including, e.g., in graphs, charts, progress bars, and gauges. These measures may be used to describe the changing of the score over time, or may compare the current user's score to peer groups or suggested minimum values. The score and its associated visualizations update in real time if an action is taken to modify the digital personal profile. In this way, the customer sees immediate value to his/her actions, e.g., to performing one or more of suggested actions 30.

As shown in the below Table 1, digital security score 20 is generated through the aggregation of various sub-scores, i.e., a transaction history score, a monitoring and logging score, a personal profile setup score and a banking profile score. Generally, a transaction history score is a value indicative of a measure of a user's compliance with a system's rules and indicative of the types of interactions the user has had with the system. Generally, a monitoring and logging score is a value indicative of how well a user's account and online interactions are being monitored. Generally, a personal profile setup score is a value indicative of a quality of a user's personal profile. Generally, a banking profile score is value indicative of a quality of a user's interactions that are specific to a particular sector, e.g., the banking sector.

TABLE 1

Digital Security Score = w(Transaction History Score) +
w(Monitoring/Logging Score) +
w(Personal Profile Setup Score) +
w(Banking Profile Score)

As shown in the above Table 1, the digital security score is generated by aggregating the sub-scores (i.e., the transaction history score, the monitoring/logging score, the personal profile setup score and the banking profile score). In a variation, the digital security score is generated by aggregating two or more of these sub-scores or other types of sub-score. A value of the sub-score is modified by the application of a weight, w, to the sub-score. The digital security score is an aggregate value of each of the modified (weighted) sub-scores. As shown in Table 1, each of the sub-scores is modified by the same amount (i.e., has a same applied weight). In a variation, sub-scores are modified by different amounts (i.e., by different weights). As described below, each of the sub-scores is itself a weighted value, based on a weight that is specific to a sub-score. The weight, w, represents a final weighting that is applied to the sub-score.

As shown in Table 2 below, the weight, w, applied to each of the sub-scores is itself an aggregation of various different sub-weights.

TABLE 2

$w = \Sigma w_1 \ldots w_n$

As shown in Table 2 above, the weight, w, is an aggregation of various sub-weights, $w_1 \ldots w_n$. These sub-weights (e.g., modifiers) are pre-determined values, as shown in the below Table 3.

TABLE 3

| | Modifiers | | | |
| --- | --- | --- | --- | --- |
| | Investor Risk based on trading behavior | Quest bonus (+5% for recently taking action, decays over time) | Environmental modifier (set by an institution for systemic risk factors) | Total Adjusted Score Modifiers Subscore |
| User 1 | −0.1 | 0 | −0.1 | 0.8 |
| User 2 | 0.1 | 0.05 | 0 | 1.15 |
| User 3 | 0.07 | 0 | 0 | 1.07 |
| User 4 | 0.1 | 0.05 | −0.1 | 1.05 |
| User 5 | 0.03 | 0.05 | 0 | 1.08 |
| User 6 | −0.1 | 0 | 0 | 0.9 |
| User 7 | 0.1 | 0 | −0.1 | 1 |

The above Table 3 shows values of weights, w, and sub-weights ($w_1 \ldots w_n$) for a plurality of different users, i.e., users 1-7. The weight w is based on the sub-weights ($w_1 \ldots w_n$), e.g., by aggregating the sub-weights or by applying a mathematical operation to the sub-weights. As shown in the above Table 3, one type of sub-weight is an amount of investor risk based on trading behavior. System 16 determines the amount of investor risk using a lookup table in which pre-defined values (e.g., an average number of monthly transactions) are mapped to investor risk values, e.g., in accordance with investor risk decreasing as the number of transactions decreases. For example, 0-1 average transactions a month corresponds to an investor risk value of 0.1. An average of two transactions a month corresponds to an investor risk value of 0.09. An average of twenty to twenty-five transactions a month corresponds to an investor risk value of −0.05. The sub-weight for investor risk varies by user, e.g., because each user exhibits different trading behavior and thus a different amount of attendant risk. Another type of sub-weight is a suggested action (i.e., quest) bonus, e.g., for performance of a suggested action. In an example, system detects that a user has used a social security number as a password and suggests that the user change the password and will provide the user with a 5% increase in score value upon completing the action of changing the password. In another example, a user does not have virus protection on a user device. System 16 generates a suggested action of installing virus protection and offers the user a 5% increase in the security score for performing this action. When the user has performed the suggested action, the user receives a 5% increase in its sub-scores, represented as a 0.05 value for a sub-weight. Another type of sub-weight is an environmental factor for systemic risk factors. Systemic risk factors are constants that are applied to customers of a certain type. For example, if an entity managing an account notices that a high degree of fraud is currently happening in the state of Florida, then users with accounts in Florida may temporarily receive a negative mark here. System 16 aggregates the sub-weights for each of the users to determine the weight to be applied to the sub-scores for the user.

System 16 applies the weight, w, to each of the sub-scores to generate weighted sub-scores (i.e., modified sub-scores), as shown in the below Table 4.

TABLE 4

| | Modified Transaction History Score | Modified Monitoring and Logging Score | Modified Personal Profile Score | Modified Banking Profile Score | Total Adjusted Score Digital Security Score |
| --- | --- | --- | --- | --- | --- |
| User 1 | 0 | 128 | 0 | 128 | 256 |
| User 2 | 207 | 414 | 598 | 598 | 1817 |
| User 3 | 128.4 | 171.2 | 299.6 | 256.8 | 856 |
| User 4 | 94.5 | 378 | 336 | 420 | 1228.5 |
| User 5 | 162 | 385.8 | 216 | 385.8 | 1155.6 |
| User 6 | 27 | 180 | 360 | 180 | 747 |
| User 7 | 50 | 280 | 240 | 400 | 1010 |

As shown in the above Table 4, for each user, system 16 generates weighted sub-scores (e.g., a modified transaction history score, a modified monitoring and logging score, a modified personal profile score and a modified banking score). System 16 aggregates the weighted sub-scores to determine the final digital security score, e.g., for each of users 1-7.

As shown in the below Table 5, one type of sub-score is the transaction history score. The transaction history score assigns values to various pre-defined attributes, e.g., compliance attributes and interaction attributes.

TABLE 5

Transaction History Score = $w_{TH}(\Sigma \text{compliance scores}_{1 \ldots n} + \Sigma \text{interaction scores}_{1 \ldots n})$ The transaction history score is itself calculated from other types of scores e.g., compliance scores and interaction scores. Generally, a compliance score is a value indicative of a proximity of a user's predefined thresholds to the threshold set by system 16. For example, a user sets a predefined threshold that if there is a 30% increase in unusual activity (e.g., an unusual number of requests to system 16 or an unusual increase in a dollar amount of transaction) to alert the user. System 16 sets a system threshold to alert the user when there is a 20% increase unusual activity. System 16 determines that there is a 10% differential in the user's threshold and the system threshold. Based on this differential, system 16 selects a compliance score, e.g., based on a mapping that maps differential percentages to predefined values that are the compliance scores. Compliance scores are a calculation based on how close defined monitoring levels are to recommended standards. A compliance score is determined based on the following equation: 20−(20*absolute value(recommended $ value−actual $ value)/(actual $ value)). If system 16 recommends $10,000 alerting for a user, and he has alerting set for amounts>$15,000 instead, this would give him a score of 10 [20−(20*abs(10 k−15 k)/10 k)]. If he lowers his alert to >$12000, this raises his score to 16. 20 is the highest score possible and 0 is the lowest.

As shown in the above Table 5, system 16 determines multiple compliance scores$_{1 \ldots n}$ for a user and multiple interaction scores$_{1 \ldots n}$ for the user. Generally, an interaction score is a value indicative of a quality and/or trustworthiness of a user's interactions with system 16. For example, an interaction score is based on whether the user has had any previous problems or call-ins. When the user has had previous problems or call-ins, system 16 sets a pre-defined value of zero for the interaction score. When the user has not had previous problems or call-ins, system 16 sets a pre-defined value of twenty for the interaction score. Other interaction scores are based on whether the user has had repeated failed login attempts or has used trusted phone numbers for interactions or for account access.

System 16 aggregates the determined compliance score(s) and interaction score(s) for the user and applies a transaction history weight, $w_{TH}$, to the aggregated compliance score(s) and interaction score(s) to calculate the transaction history score. The transaction history weight is a pre-defined value, e.g., that is set by an administrator of system 16, to specify the importance of the transaction history score relative to the importance of the other types of sub-scores in calculating the digital security score.

Table 6 below shows transaction history scores that are calculated by system 16 for users 1-7.

TABLE 6

Transaction History Score

| Compliance | Interaction | | | Total Adjusted Score |
|---|---|---|---|---|
| How close are your defined thresholds in your profile to Fidelity's | Any previous problems or call ins? (20 for none) | Repeated failed login attempts? (10 for no) | Demonstrated use of trusted phone numbers? (10 for yes) | Transaction History Score total with multiplier 3 |
| User 1 | 0 | 0 | 0 | 0 | 0 |
| User 2 | 20 | 20 | 10 | 10 | 180 |
| User 3 | 10 | 20 | 0 | 10 | 120 |
| User 4 | 20 | 0 | 0 | 10 | 90 |
| User 5 | 20 | 20 | 10 | 0 | 150 |
| User 6 | 0 | 0 | 0 | 10 | 30 |
| User 7 | 20 | 0 | 0 | 10 | 90 |

As shown in the above Table 6, system 16 calculates the transaction history score based on one compliance score and three different interaction scores. Each of the compliance score and the interaction scores represents a value for pre-defined attributes. System 16 evaluates these attributes across various dimensions. For example, the compliance attribute is evaluated across the dimension of prior call-ins and across the other dimension of a closeness of the threshold to pre-defined threshold. For the other tables below, the attributes shown in these tables are also evaluated across multiple dimensions. The weight $w_{TH}$ has a predefined value of 3. The column titled "transaction history score total with multiplier" is the transaction history score, after application of the weight $w_{TH}$.

Referring to Table 7, system 16 also generates a monitoring and logging score, which is one of the sub-scores used in generating the digital security score, as previously described. The monitoring and logging score assigns values to various pre-defined attributes, e.g., account change attributes, monitored transaction attributes and device attributes. For example, the account changes score represents an assigning of a value to the account changes attribute.

TABLE 7

Monitoring and Logging Score = $w_{ML}(\Sigma\text{account changes scores}_{1...n} + \Sigma\text{monitored transaction scores}_{1...n} + \Sigma\text{devices scores}_{1...n})$ The monitoring and logging score is itself calculated from other types of scores e.g., account changes scores, monitored transaction scores and devices scores. Generally, an account changes score is a value indicative of whether a user has set-up monitoring for particular aspects of the user's account. When the user has implemented monitoring for the particular aspect of the account, system 16 specifies a predefined value as the account changes score. One type of account changes score is based on a monitored address change, where a user is assigned 20 points when the user has configured monitoring to detect address changes. The monitored transaction score is a value indicative of how transactions are being monitored, e.g., whether transaction frequency is being monitored, whether standing instructions are being monitored, whether transaction frequency is being monitored and so forth. Based on the type(s) of transaction(s) the system is monitoring (or the user has set-up for monitoring), system 16 assigns a predefined value (e.g., a value of 10) to be the value of the monitored transaction score. Generally, the devices score is a value indicative of whether certain types of devices (e.g., trusted devices—a device that has been predefined in the user's profile) are being monitor or whether trusted locations are being monitored. A trusted location refers to a geographic location that is considered normal for a user. For example, a customer may live in Dallas and travel to Boston, but a transaction originating in China would not be considered normal. System 16 obtains this information through various methods including IP address, GPS, and cell phone tower triangulation. Based on the type(s) of device(s) the system is monitoring (or the user has set-up for monitoring), system 16 assigns a predefined value (e.g., a value of 10) to be the value of the devices score.

As shown in the above Table 7, system 16 determines multiple account changes scores$_{1...n}$ for a user, multiple monitored transactions scores$_{1...n}$ and multiple devices scores for the user. System 16 aggregates the account changes scores$_{1...n}$ for a user, multiple monitored transactions scores$_{1...n}$ and multiple devices scores for the user and applies a monitoring/logging weight, $w_{ML}$, to the aggregated scores to calculate the monitoring and logging score. The monitoring/logging weight is a pre-defined value, e.g., that is set by an administrator of system 16, to specify the importance of the monitoring and logging score relative to the importance of the other types of sub-scores in calculating the digital security score.

Table 8 below shows monitoring and logging scores that are calculated by system 16 for users 1-7.

TABLE 8

Monitoring and Logging Score

| | Account Changes | | Transactions | | | Devices | | Total Adjusted Score |
|---|---|---|---|---|---|---|---|---|
| | Monitored funding sources (20 points, always on) | Monitored address changes (20 points, always on) | Monitored transaction frequency (10 for yes) | Monitored transaction threshold (10 for yes) | Monitored use of standing instructions (10 for yes) | Monitored trusted devices (10 for yes) | Monitored trusted locations (10 for yes) | Monitoring and Logging Score total with multiplier 4 |
| User 1 | 20 | 20 | 0 | 0 | 0 | 0 | 0 | 160 |
| User 2 | 20 | 20 | 10 | 10 | 10 | 10 | 10 | 360 |
| User 3 | 20 | 20 | 0 | 0 | 0 | 0 | 0 | 160 |
| User 4 | 20 | 20 | 10 | 10 | 10 | 10 | 10 | 360 |
| User 5 | 20 | 20 | 10 | 10 | 10 | 10 | 10 | 350 |
| User 6 | 20 | 20 | 0 | 0 | 10 | 0 | 0 | 200 |
| User 7 | 20 | 20 | 10 | 10 | 10 | 0 | 0 | 280 |

As shown in the above Table 8, system 16 calculates the monitoring and logging score based on two account changes scores, three monitored transaction scores, and two devices scores. The weight $w_{ML}$ has a predefined value of 4. The column titled "monitoring and logging score total with multiplier 4" is the transaction history score, after application of the weight $w_{ML}$.

Referring to Table 9 below, system 16 also generates a personal profile setup score, which is one of the sub-scores used in generating the digital security score, as previously described. The personal profile setup score assigns values to various pre-defined attributes, e.g., profile attributes, password attributes and profile device attributes.

TABLE 9

Personal Profile Setup Score = $w_{PP}(\Sigma \text{profile scores}_{1 \ldots n} + \Sigma \text{password scores}_{1 \ldots n} + \Sigma \text{profile device scores}_{1 \ldots n})$ The person profile setup score is itself calculated from other types of scores e.g., profile scores, password scores and profile device scores. Generally, a profile score is value indicative of a quality of a portion (e.g., an address portion, a preferred contact portion, and so forth) of the user's profile. System 16 sets values of the profile scores in a range of 0-20, based on currency. Currency refers to how current the information on file is. Currency is described as 20-(number of weeks since a field has been confirmed or changed/4). System 16 also sets the value of the profile scores by determining whether information for the relevant portion has been updated within a specified number of days. When the information has been updated within the specified number of days, system 16 sets the profile score to be a particular pre-defined value. When the information has not been updated within the specified number of days, system 16 sets the profile score to be another particular pre-defined value.

Generally, a password score is a value indicative of a quality of a user's password for accessing an account. One password score specified whether a password has been changed recently (i.e., within a threshold number of days). When the password has been changed recently, system 16 sets the password score to be a predetermined value. When the password has not been changed recently, system 16 sets the password score to be another predetermined value.

Generally, a profile device score is a value specifying a quality of the particular devices that are executing a transaction or otherwise accessing an account. One profile device score specifies whether a device has trusted antivirus installed. When the device has trusted antivirus installed, system 16 sets a particular value for that profile device score. When the device does not have trusted antivirus installed, system 16 sets another value for that profile device score.

As shown in the above Table 9, system 16 determines multiple profile scores$_{1 \ldots n}$, password scores$_{1 \ldots n}$ and profile device scores$_{1 \ldots n}$, for the user. System 16 aggregates profile scores$_{1 \ldots n}$, password scores$_{1 \ldots n}$ and profile device scores$_{1 \ldots n}$ for the user and applies a personal profile weight, $w_{PP}$, to the aggregated scores to calculate the personal profile setup score. The personal profile weight is a pre-defined value, e.g., that is set by an administrator of system 16, to specify the importance of the personal profile setup score relative to the importance of the other types of sub-scores in calculating the digital security score.

Table 10 below shows personal profile setup scores that are calculated by system 16 for users 1-7.

TABLE 10

| | General Profile Setup Score | | | | | | | | | Total Adjusted Score Personal Profile |
|---|---|---|---|---|---|---|---|---|---|---|
| | Profile | | Password | | Devices | | | | | |
| | Address up to date (0-20 based on currency) | Preferred contact up to date (0-20 based on currency) | Password charged recently (10 for yes) | SSV used as login (10 for no) | Trusted devices defined (10 for yes) | Trusted locations defined (10 for yes) | Operating system supported (10 for yes) | Trusted Antivirus installed (10 for yes) | Lowset supported (10 for yes) | Score total with multiplier 4 |
| User 1 | 0 | 0 | 0 | 0 | 0 | 0 | 0 | 0 | 0 | 0 |
| User 2 | 20 | 20 | 10 | 10 | 10 | 10 | 10 | 10 | 10 | 620 |
| User 3 | 10 | 10 | 0 | 10 | 10 | 10 | 0 | 10 | 0 | 290 |
| User 4 | 0 | 0 | 10 | 10 | 10 | 0 | 10 | 10 | 10 | 320 |

TABLE 10-continued

| | General Profile Setup Score | | | | | | | | | Total Adjusted Score Personal Profile |
|---|---|---|---|---|---|---|---|---|---|---|
| | Profile | | Password | | Devices | | | | | |
| | Address up to date (0-20 based on currency) | Preferred contact up to date (0-20 based on currency) | Password charged recently (10 for yes) | SSV used as login (10 for no) | Trusted devices defined (10 for yes) | Trusted locations defined (10 for yes) | Operating system supported (10 for yes) | Trusted Antivirus installed (10 for yes) | Lowset supported (10 for yes) | Score total with multiplier 4 |
| User 5 | 0 | 0 | 10 | 10 | 0 | 0 | 10 | 10 | 10 | 200 |
| User 6 | 20 | 20 | 20 | 10 | 0 | 0 | 10 | 10 | 0 | 400 |
| User 7 | 30 | 20 | 0 | 0 | 0 | 0 | 0 | 0 | 0 | 200 |

As shown in the above Table 10, system 16 calculates the personal profile setup score based on two profile scores, two password scores, and five profile device scores. The weight $w_{PP}$ has a predefined value of 4. The column titled "personal profile score total with multiplier 4" is the personal profile setup score, after application of the weight $w_{PP}$.

Referring to Table 11 below, system 16 also generates a banking profile score, which is one of the sub-scores used in generating the digital security score, as previously described. The banking profile score assigns values to various pre-defined attributes, e.g., account attributes, and defined action attributes.

TABLE 11

Banking Profile Score = $w_{BP}(\Sigma\text{account scores}_{1 \ldots n} + \Sigma\text{defined action scores}_{1 \ldots n})$ System 16 generates the banking profile score from one or more account scores and one or more actions scores. System 16 applies a weight, $w_{BP}$, to the aggregated value of the account scores and defined action scores, to generate the banking profile score. Generally, an account score is a value indicative of a quality or security of a user's account or of the set-up of the users account. For example, one account score is indicative of whether a user has joint or lined accounts. When the user has a joint/linked account, system 16 sets the account score to be a predefined value (e.g., a value of zero to specify that a joint/linked account is not a particularly secure feature). When the user does not have a joint/linked account, system 16 sets the account score to be another predefined value (e.g., a value of 10 to specify that lack of a joint/linked account is a more secure feature). Generally, a defined action score is a value indicative of a quality of system specified actions and user confirmed (or specified) actions. One defined action score indicates whether the system has set default transaction thresholds. These thresholds refer to the transaction alerting thresholds as described with regard to compliance scores. The system defined thresholds are suggestions. Another defined action score indicates that the user has confirmed the transaction threshold. When the user has confirmed the transaction threshold, system 16 sets the defined action score to be one value. When the user has not confirmed the transaction threshold, system 16 sets the defined action to be another value.

As shown in the above Table 11, system 16 determines multiple account scores$_{1 \ldots n}$ and defined action scores$_{1 \ldots n}$ for the user. System 16 aggregates account scores$_{1 \ldots n}$ and defined action scores$_{1 \ldots n}$ for the user and applies a banking profile weight, $w_{BP}$, to the aggregated scores to calculate the banking profile score. The banking profile weight is a pre-defined value, e.g., that is set by an administrator of system 16, to specify the importance of the banking profile score relative to the importance of the other types of sub-scores in calculating the digital security score.

Table 12 below shows banking profile scores that are calculated by system 16 for users 1-7.

TABLE 12

| | Banking Profile Score | | | | | | | | Total Adjusted Score Banking Profile |
|---|---|---|---|---|---|---|---|---|---|
| | Account | | | | Defined Actions | | | | |
| | Type of bank accounts set up (10 for trusted partners) | Standing instructions set up (10 for yes) | Joint or linked accounts (10 for no) | Benefidaries defined (10 for yes) | System default normal transaction thresholds (20) | User confirmed transaction thresholds (20 additional) | System default normal transaction frequencies (20) | User confirmed transaction frequencies (20 additional) | Score total with multiplier 4 |
| User 1 | 0 | 0 | 0 | 0 | 20 | 0 | 20 | 0 | 160 |
| User 2 | 10 | 10 | 10 | 10 | 20 | 20 | 20 | 20 | 520 |
| User 3 | 10 | 0 | 0 | 10 | 20 | 0 | 20 | 0 | 240 |
| User 4 | 0 | 0 | 10 | 0 | 20 | 20 | 20 | 20 | 400 |
| User 5 | 0 | 0 | 0 | 0 | 20 | 20 | 20 | 20 | 360 |
| User 6 | 0 | 10 | 0 | 0 | 20 | 0 | 20 | 0 | 200 |
| User 7 | 10 | 0 | 0 | 10 | 20 | 20 | 20 | 20 | 400 |

As shown in the above Table 12, system 16 calculates the banking profile based on four account scores and four defined action scores. The weight $w_{BP}$ has a predefined value of 4. The column titled "banking profile score total with multiplier 4" is the banking profile score, after application of the weight $w_{BP}$.

In a variation, system 16 applies weighted values (e.g., $w_{TH}$, $w_{ML}$, $w_{PP}$ and $w_{BP}$) to corresponding sub-scores, after calculation of the sub-scores. In this variation, system 16 computes the digital security score in accordance with the below equation:

Digital Security Score=$(w_{TH}$*(Transaction History Score)+$w_{ML}$*(Monitoring and Logging Score)+$w_{PP}$*(Personal Profile Setup Score)+$w_{BP}$*(Banking Profile Score))*(Modifier Score).

In this variation, the modifier score is the final weighting, w, described above. The sub-scores are further modified by the final weighting. In this variation, the Transaction History Score=($\Sigma$compliance scores$_{1...n}$+$\Sigma$interaction scores$_{1...n}$), the Monitoring and Logging Score=($\Sigma$account changes scores$_{1...n}$+$\Sigma$monitored transaction scores$_{1...n}$+$\Sigma$devices scores$_{1...n}$), the Personal Profile Setup Score=($\Sigma$profile scores$_{1...n}$+$\Sigma$password scores$_{1...n}$+$\Sigma$profile device scores$_{1...n}$) and the Banking Profile Score=($\Sigma$account scores$_{1...n}$+$\Sigma$defined action scores$_{1...n}$).

Figure 2:
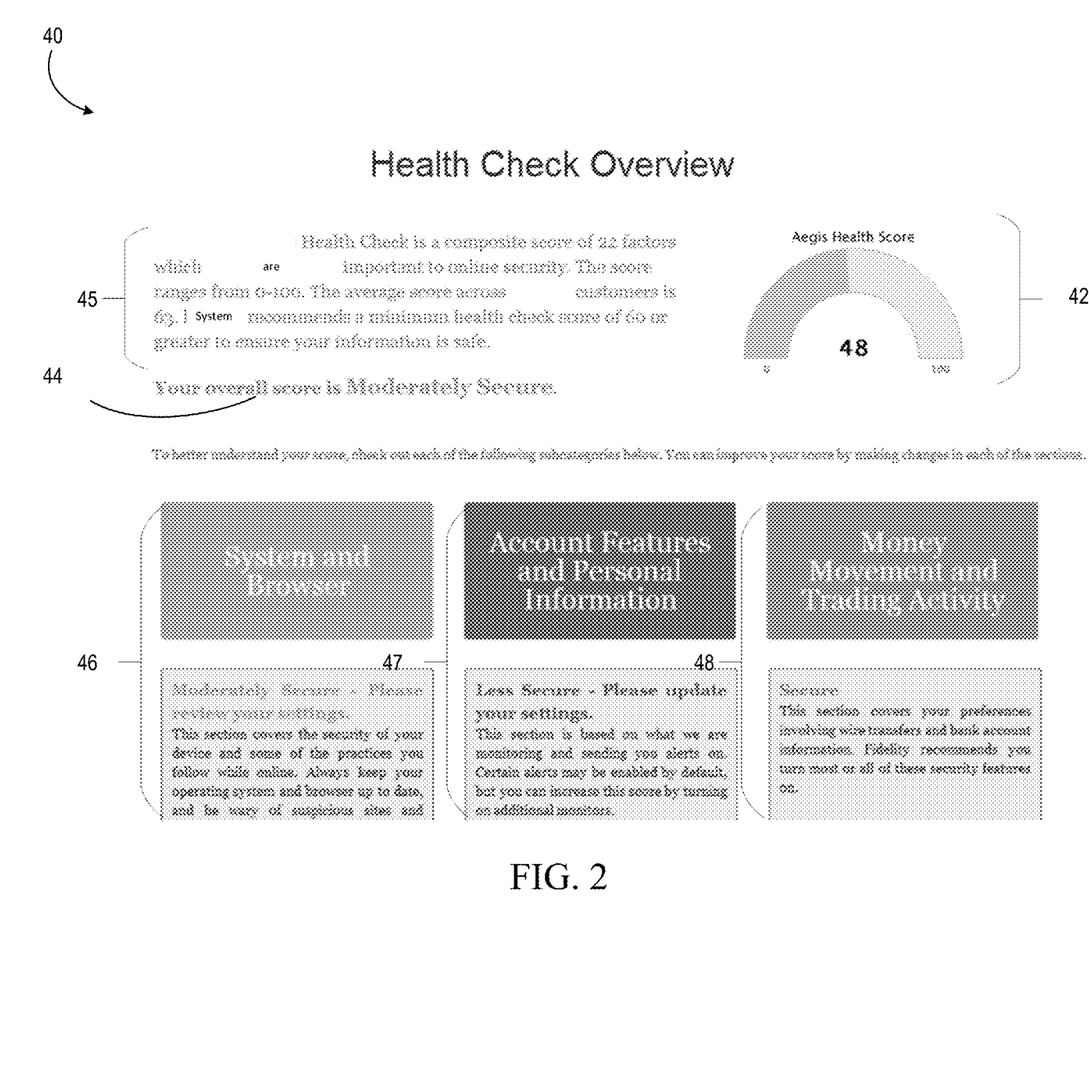
FIGS. 2-4 are graphical user interfaces provided by the system for identifying a measure of online security.

Referring to FIG. 2, graphical user interface 40 provides an overview of a user's online security. Graphical user interface 40 includes visual representation 42 of the digital security score. Visual representation 42 (or portions thereof) may be color coded with a green color (to specify that the user's online profile and presence is very secure), a yellow color (to specify that the user's online profile and presence is moderately secure) or a red color (to specify that the user's online profile and presence is not secure). Graphical user interface 40 also includes portion 44 which displays information qualifying the digital security score, e.g., by specifying whether the score is indicative of a low level of security, a high level of security or a moderate level of security. Graphical user interface 40 also includes portion 45 that includes information describing how the digital security score is calculated, the range of potential values and a recommended, minimum score.

Graphical user interface 40 also includes portions 46, 47, 48 for specifying a level of security across different areas of a user's account and the user's device. Portions 46, 47, 48 are color coded yellow, red and green, respectively, to further signify the level of security. Portion 46 specifies the amount of security for the user's device, e.g., by qualifying the security of the user's system and browser. In this example, the user's system and browser are moderately secure. Accordingly, portion 46 is color coded yellow to signify the moderate amount of security. System 16 determines a qualification for the system and browser security based on the personal profile setup score (Table 9 above). In this example, system 16 specifies various ranges for the personal profile setup score, as shown in the below Table 13.

TABLE 13

| Personal Profile Setup Score | Qualification |
| --- | --- |
| 0-20 | Less Secure |
| 21-60 | Moderately Secure |
| 61-100 | Secure |

As shown in the above Table 13, system 16 specifies that a personal profile setup score in the range of 0-20 signifies less security. To increase the amount of security, system 16 suggests additional actions that may be performed, such as upgrading your browser. System 16 specifies that a personal profile setup score in the range of 21-60 signifies a moderate amount of security. For a moderate amount of security, system 16 still specifies suggested action to increase the amount of security even more. System 16 specifies that a personal profile setup score in the range of 61-100 signifies that the system is secure and that no further actions are required.

Portion 47 specifies the amount of security for the user's account features and personal information. In this example, the user's account and personal information is not very secure. Accordingly, portion 47 is color coded red to signify that immediate action is required of the user to increase the security level. System 16 determines a qualification for the account features and personal information based on the monitoring and logging score (Table 7 above). In this example, system 16 specifies a mapping between ranges for the monitoring and logging scores and qualifications (e.g., severe, moderate, secure).

Portion 48 specifies the amount of security for the user's financial activity. In this example, the user's settings for monitoring financial activity are secure. Accordingly, portion 48 is color green to represent this high level of security. System 16 determines a qualification for the financial activity based on the banking profile score (Table 11 above). In this example, system 16 specifies a mapping between ranges for the banking profile scores and qualifications (e.g., severe, moderate, secure).

Figure 3:
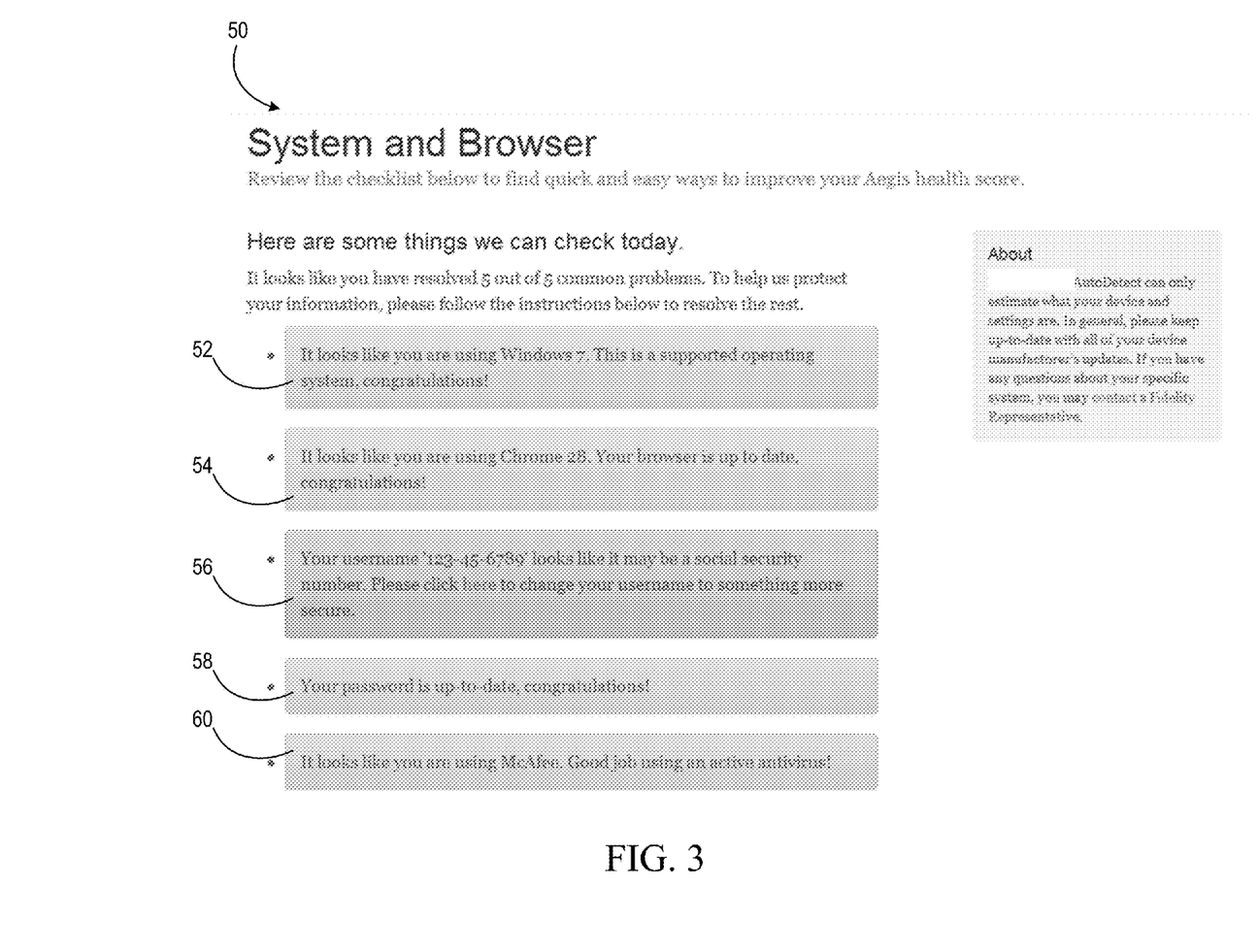

Referring to FIG. 3, graphical user interface 50 provides the user with the results of a scan of a user device and the user's online accounts, e.g., to indicate ways in which the user can improve the digital security score. Graphical user interface 50 includes portions 52, 54, 56, 58 and 60. Each of portions 52, 54, 58 and 60 indicates that the user's device and/or accounts comply with the various security requirements. Portion 56 specifies that the username may be a security breech by using the user's social security number. In this example, portion 56 is color coded red to highlight the potential security violation and to highlight the attendant suggested action. As such, portion 56 prompts the user to change the user name. The information displayed in portions 52, 54, 56, 58 and 60 is used by system 16 in determining the personal profile setup score, e.g., the information in portion 58 is used in determining the password score. In this example, system 16 detects that the user likely has used a social security number as a password. As such, one of the password scores will be set to a value of zero.

Figure 4:
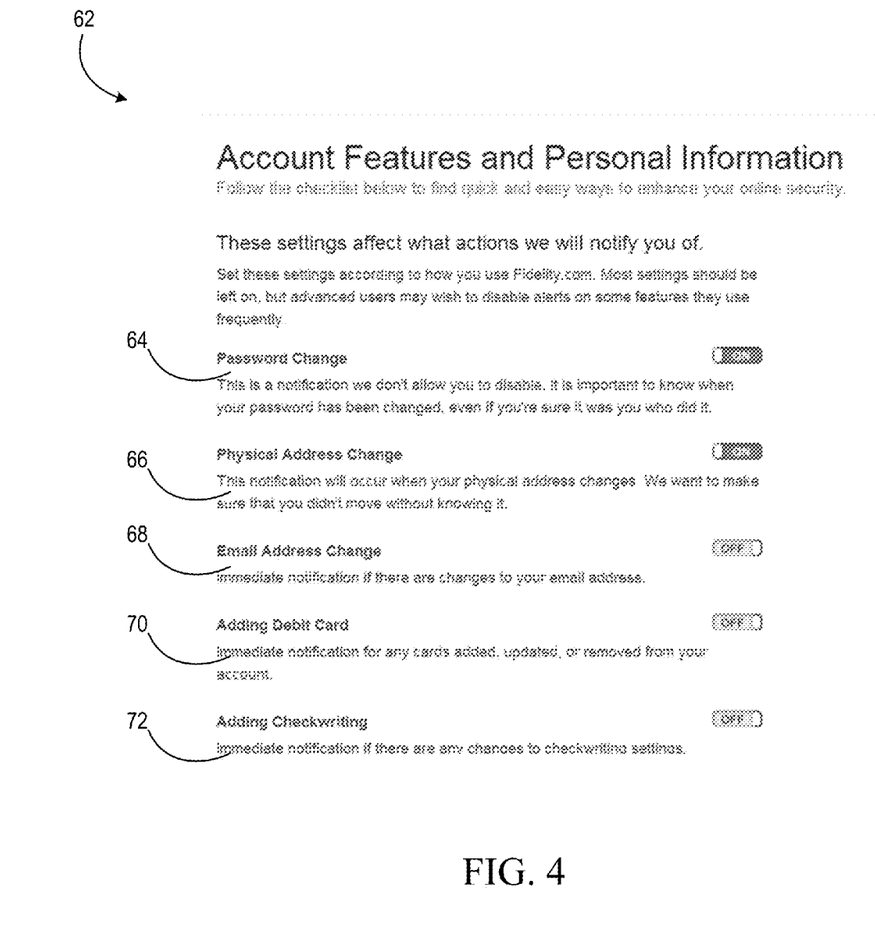

Referring to FIG. 4, graphical user interface 62 enables a user to specify account settings, e.g., to increase a level of online security. As previously described, these account settings are used by system 16 in determining the monitoring and logging score. Graphical user interface 62 includes portion 64 that specifies that system 16 is monitoring for password changes in the user's account, e.g., via a password change notification change setting. A user cannot change this setting. Graphical user interface 62 also includes portion 66 that includes a setting to be notified of a physical address change, e.g., when a physical address change is specified in a user's account. Turning this setting to an "on" position increases a user's digital security profile, e.g., by increasing the monitoring and logging score, e.g., by increasing the account changes score.

Graphical user interface 62 also includes portion 68 that specifies a setting to be notified of email address changes. Turning this setting on also increases a user's digital security score. Graphical user interface 62 also includes portion 70 that specifies a setting for monitoring when a debit card is added to the account and being notified of the added debit card. Turning this setting on also increases the digital security score. Graphical user interface 62 also includes portion 72 that includes a setting for adding notifications for changes to check writing settings. Turning this setting on also increases the digital security score.

Figure 5:
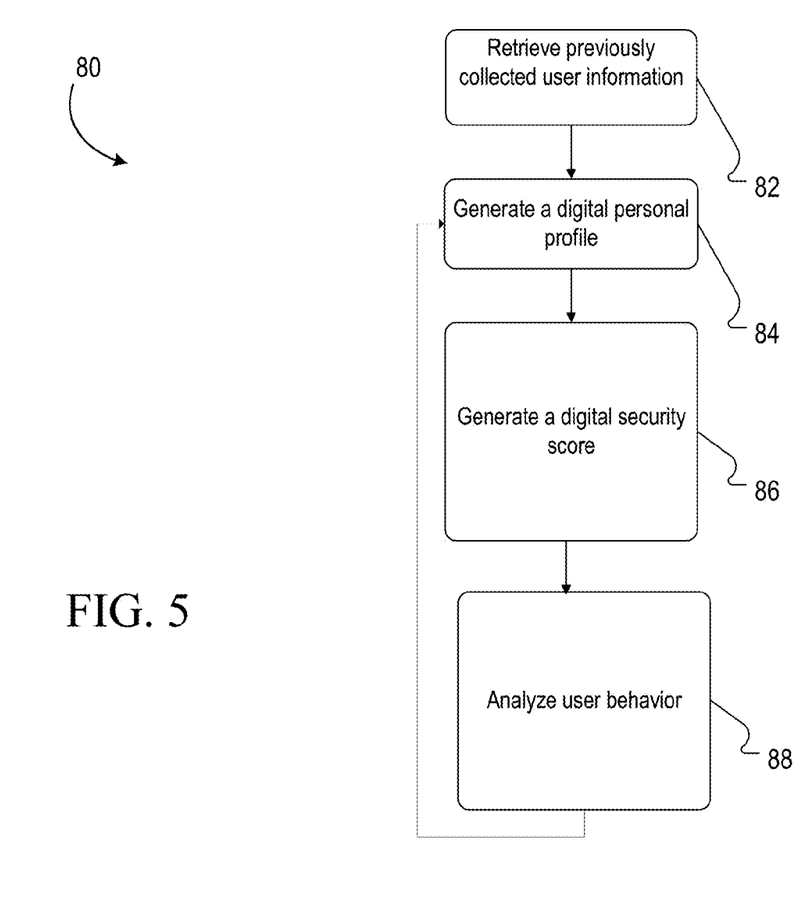
FIG. 5 is a flow diagram of a process for identifying a measure of online security.

Referring to FIG. 5, system 16 implements process 80 in generating a digital security score. In operation, system 16 retrieves (82) previously collected user information, including, e.g., previously collected trade information, previously collected name and address information, and so forth. System 16 uses previously collected information to reduce or to eliminate an amount by which users are queried and prompted for information. By doing so, system 16 generates a digital security score with no or minimal interruption to a user.

System 16 generates (84), based on the previously collected user information, a digital personal profile that is a composite of a set of pre-defined attributes for measuring a level of online security. For example, the set of pre-defined attributes include the attributes show in Tables 6, 8, 10 and 12. In this example, system 16 retrieves information from data repository 18 generating the digital personal profile. System 16 generates (86) a digital security score that measures an aggregate strength of values of the set of pre-defined attributes in the digital personal profile. System 16 also analyzes (88) user behavior, e.g., after a user has viewed the digital score. For example, system 16 analyzes whether a user has performed any of the suggested actions, e.g., to increase the security score. When a user has performed a suggested action, the user's personal profile is update with information specifying which suggested actions the user has performed. System 16 periodically repeats actions 84, 86 to update the digital personal profile and to update the digital security score (based on the updated digital personal profile), to account for the dynamically changing nature of the user score. The score and personal profile will periodically be updated based on actions the user takes.

Figure 6:
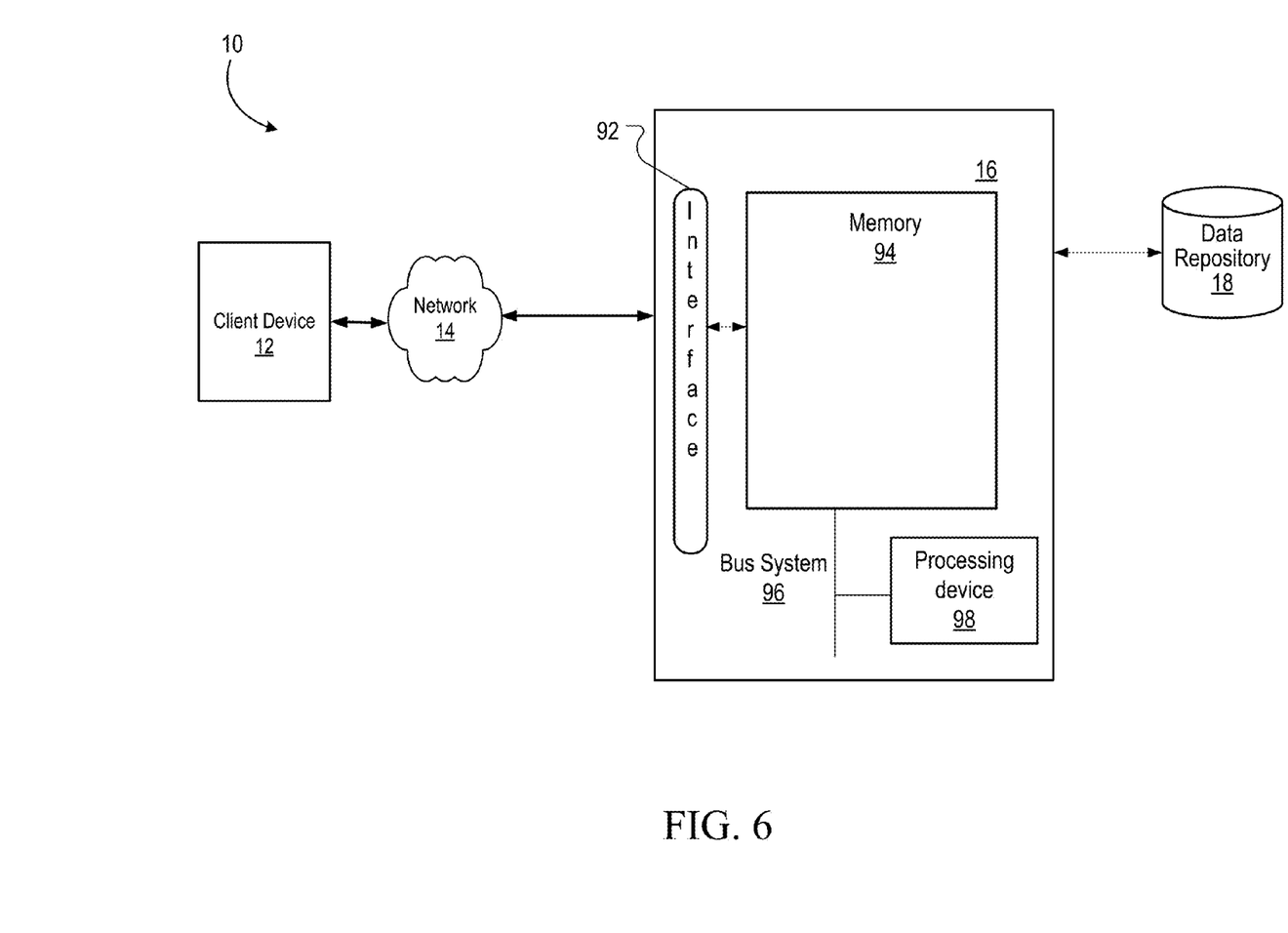
FIG. 6 is a block diagram of components of the system for identifying a measure of online security.

Referring to FIG. 6, client device 12 can be any sort of computing device capable of taking input from a user and communicating over network 14 with system and/or with other client devices. Client device 12 can be a mobile device, a desktop computer, a laptop, a cell phone, a personal digital assistant ("PDA"), a server, an embedded computing system, a mobile device and so forth.

System 16 can be any of a variety of computing devices capable of receiving information, such as a server, a distributed computing system, a desktop computer, a laptop, a cell phone, a rack-mounted server, and so forth. System 16 may be a single server or a group of servers that are at a same location or at different locations.

System 16 can receive information from client device 12 via interface 92, which is any type of interface capable of receiving information over a network, such as an Ethernet interface, a wireless networking interface, a fiber-optic networking interface, a modem, and so forth. System 16 also includes a processor 98 and memory 94. A bus system 96, including, for example, a data bus and a motherboard, can be used to establish and to control data communication between the components of system 16. Processor 98 may include one or more microprocessors. Generally, processor 98 may include any appropriate processor and/or logic that is capable of receiving and storing data, and of communicating over a network (not shown). Memory 94 can include a hard drive and a random access memory storage device, such as a dynamic random access memory, machine-readable media, or other types of non-transitory machine-readable hardware storage devices.

Figure 7:
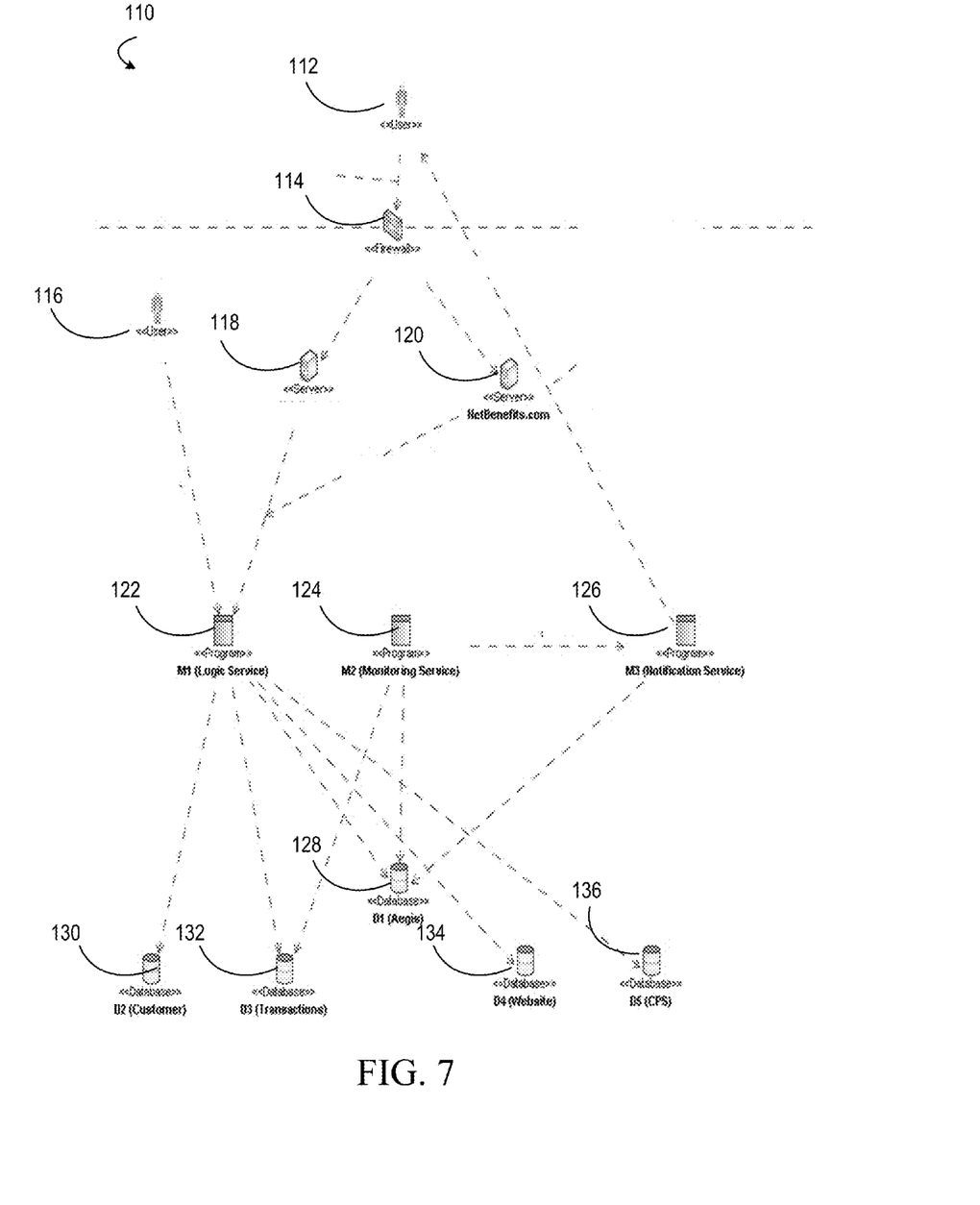

Referring to FIG. 7, environment 110 monitors online security of a user, e.g., in accessing one or more systems of an entity (e.g., a financial services provider, a credit card provider, a mobile communications provider, and so forth). In operation, user 112 accesses one or more of systems 118, 120 via firewall 114. An entity control systems 118, 120 and firewall 114. System 118 executes one or more types of applications and/or services. System 120 executes other types of services and/or applications, e.g., in a distributed, networked environment. User 112 accesses websites that provide an interface to the various applications and services. These websites may be hosted via systems 118, 120. Systems 118, 120 communication with logic service 122. Generally, a logic service is a computational component of an application. It is run on a secure, internally hosted server, e.g., on system 16. Whenever a calculation as to a score value is necessary, a request is made to the logic service which will in turn query the data layers as necessary.

Rather that accessing services of the entity via systems 118, 120, a user can also call into a telephonic system and contact phone representative 116. Phone representative 116 uses an administrative portal on logic service 122 (e.g., that is executed on a system).

Environment 110 also includes monitoring service 124 (e.g., that is executed on a system, such as system 16 in FIG. 1). Generally, monitoring service 124 is a computer program that monitors a user's account for unusual activity (e.g., an increase in trading activity or purchases), monitors digital personal profile 22 (FIG. 1) for changes (e.g., such as password changes, physical address changes, and debit card changes, and so forth), etc. Upon detection of a change, monitoring service 124 sends a message to notification service 126, which in turns sends a notification message to a client device of user 112. Generally, a notification service is a computer program that is configured to directly communication with a user, in accordance with the user defined preferences. A user may specify (via the personal profile) preferences for how the user wants to be notified, e.g., by receiving a text message, by receiving a telephone call, and so forth. Notification service 126 is executed on a system, e.g., system 16. The monitoring service 124 also monitors transactions as specified in the digital profile. For example, if a withdrawal is made for an amount over the specified threshold, the monitoring service 126 will notice this and will inform the notification service (126) to alert the user.

Environment 110 also includes databases 128, 130, 132, 134, 136. Database 128 stores information for measuring and monitoring online security. For example, database 128 stores the digital security score, the digital personal profile, and the suggested actions. In building the digital personal profile, database 128 may access information stored in one or more of databases 130, 132, 134, 136. In this example, monitoring service 124 and notification service 126 each access database 128. Database 130 stores customer information, e.g., customer name information, customer address information, information specifying types of user accounts and so forth. Logic service 122 is configured to access database 130. Database 132 stores transaction information, including, e.g., information specifying types of transactions a user executes, amounts of the transactions, dates of the transactions, and so forth. Logic service 122 and monitoring service 124 are each configured for access to database 132. Monitoring service 124 accesses database 132 to determine when a transaction (or a series of transactions) represent unusual activity (e.g., a spike in a number of transactions, an increase in an amount of executed transactions, and so forth).

Database 134 stores website information and is accessible by logic service 122. Database 134 stores web session information, log-in histories, and customer usage patterns. Database 136 stores CPS information and is accessible by logic service 122. CPS refers to 'Corporate PIN Server' and is a method by which users are authenticated. A request is sent with a username and password combination and CPS determines whether these credentials are valid.]]

Embodiments can be implemented in digital electronic circuitry, or in computer hardware, firmware, software, or in combinations thereof. An apparatus can be implemented in a computer program product tangibly embodied or stored in a machine-readable hardware storage device for execution by a programmable processor; and method actions can be performed by a programmable processor executing a program of instructions to perform functions by operating on input data and generating output. The embodiments described herein, and other embodiments of the invention, can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object oriented programming language, or in assembly or machine language if desired; and in any case, the language can be a compiled or interpreted language.

Processors suitable for the execution of a computer program include, by way of example, both general and special purpose microprocessors, and any one or more processors of any kind of digital computer. Generally, a processor will receive instructions and data from a read-only memory or a random-access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Computer readable media for embodying computer program instructions and data include all forms of non-volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in special purpose logic circuitry. Any of the foregoing can be supplemented by, or incorporated in, ASICs (application-specific integrated circuits).

To provide for interaction with a user, embodiments can be implemented on a computer having a display device, e.g., a LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments can be implemented in a computing system that includes a back end component, e.g., as a data server, or that includes a middleware component, e.g., an application server, or that includes a front end component, e.g., a client computer having a graphical user interface or a Web browser through which a user can interact with an implementation of embodiments, or any combination of such back end, middleware, or front end components. The components of the system can be interconnected by any form or medium of digital data communication, e.g., a communication network. Examples of communication networks include a local area network (LAN) and a wide area network (WAN), e.g., the Internet.

The system and method or parts thereof may use the "World Wide Web" (Web or WWW), which is that collection of servers on the Internet that utilize the Hypertext Transfer Protocol (HTTP). HTTP is a known application protocol that provides users access to resources, which may be information in different formats such as text, graphics, images, sound, video, Hypertext Markup Language (HTML), as well as programs. Upon specification of a link by the user, the client computer makes a TCP/IP request to a Web server and receives information, which may be another Web page that is formatted according to HTML. Users can also access other pages on the same or other servers by following instructions on the screen, entering certain data, or clicking on selected icons. It should also be noted that any type of selection device known to those skilled in the art, such as check boxes, drop-down boxes, and the like, may be used for embodiments using web pages to allow a user to select options for a given component. Servers run on a variety of platforms, including UNIX machines, although other platforms, such as Windows 2000/2003, Windows NT, Sun, Linux, and Macintosh may also be used. Computer users can view information available on servers or networks on the Web through the use of browsing software, such as Firefox, Netscape Navigator, Microsoft Internet Explorer, or Mosaic browsers. The computing system can include clients and servers. A client and server are generally remote from each other and typically interact through a communication network. The relationship of client and server arises by virtue of computer programs running on the respective computers and having a client-server relationship to each other.

Other embodiments are within the scope and spirit of the description claims. Additionally, due to the nature of software, functions described above can be implemented using software, hardware, firmware, hardwiring, or combinations of any of these. Features implementing functions may also be physically located at various positions, including being distributed such that portions of functions are implemented at different physical locations. The use of the term "a" herein and throughout the application is not used in a limiting manner and therefore is not meant to exclude a multiple meaning or a "one or more" meaning for the term "a."

A number of exemplary embodiments of the invention have been described. Nevertheless, it will be understood by one of ordinary skill in the art that various modifications may be made without departing from the spirit and scope of the techniques described herein.

What is claimed is:
1. A computer-implemented method comprising:
retrieving, by one or more processing devices from one or more data repositories, information pertaining to a user, information pertaining to the user's system used to access resources, geographic location information, IP address, and MAC address of trusted devices used to connect the user's system to the resources;

retrieving, by the one or more processing devices from a resource activity monitoring system monitoring information pertaining to monitoring of the user's interactions with the resources;

retrieving, by the one or more processing devices information pertaining to user preferences with respect to the resources;

generating, based on the retrieved user information, a composite digital personal profile that is a composite of a set of pre-defined attributes determined from the retrieved user information, user's system information, information to connect the user's system to the resource, resource activity monitoring and user preferences with respect to the resources;

determining from a weighted aggregation of the pre-defined attributes a digital security score that measures a level of online security of accessing resources over a computer network.

2. The computer-implemented method of claim 1, further comprising:

receiving update messages from the resource activity monitoring system based on a user's access to the resource; and modifying the digital security score by a weighted amount according to the received update messages that is specific to a user for whom the digital security score is generated.

3. The computer-implemented method of claim 1, wherein the digital security score is further based on a transaction history score that is a value indicative of a measure of a user's compliance with a system's rules, and a personal profile setup score that is a value indicative a quality of the user's digital personal profile.

4. The method of claim 3, further comprising:

determining that a value of one of the scores falls within a predefined range that is indicative of an inadequate amount of security; and generating information indicative of one or more suggested actions to increase a value of the determined one of the scores.

5. The method of claim 3, further comprising:

determining a weighted amount to be applied to a score, with the weighted amount specifying an importance of the score relative to others of the scores in generating the digital security score; and applying one or more weighted amounts to one or more of the scores.

6. The method of claim 3, wherein each of the scores is a measure of a strength of one or more of the pre-defined attributes and the method further comprises:

determining which of the pre-defined attributes is evaluated by the score;

evaluating the determined pre-defined attributes, based on contents of digital personal profile;

based on evaluating, assigning a value to each of the pre-defined attributes; and generating a value for the score by aggregating the values assigned to the pre-defined attributes for that score.

7. The computer-implemented method of claim 3, further comprising:

computing the transaction history score;

computing the personal profile setup score; and wherein the generating the digital security score further comprises aggregating the transaction history score and the personal profile setup score.

8. The computer-implemented method of claim 1, further comprising:

determining that the digital security score is below a threshold value; and generating information indicative of one or more suggested actions to increase a value of the digital security score.

9. A computer program product tangibly stored on one or more machine-readable hardware storage devices, the computer program product comprising executable instructions for causing one or more processing devices to:

retrieve from one or more data repositories, information pertaining to a user, information pertaining the user's system used to access resources, geographic location information, IP address, and MAC address of trusted devices used to connect the user's system to the resources;

retrieve from a resource activity monitoring system monitoring information pertaining to monitoring of the user's interactions with the resources;

retrieve information pertaining to user preferences with respect to the resources;

generate based on the retrieved user information, a composite digital personal profile that is a composite of a set of pre-defined attributes determined from the retrieved user information, user's system information, information to connect the user's system to the resource, resource activity monitoring and user preferences with respect to the resources;

determine from a weighted aggregation of the pre-defined attributes a digital security score that measures a level of online security of accessing resources over a computer network.

10. The computer program product of claim 9, wherein the operations further comprise:

receive update messages from the resource activity monitoring system based on a user's access to the resource; and modify the digital security score by a weighted amount according to the received update messages that is specific to a user for whom the digital security score is generated.

11. The computer program product of claim 9 wherein the digital security score is further based on a transaction history score that is a value indicative of a measure of a user's compliance with a system's rules and a personal profile setup score that is a value indicative a quality of the user's digital personal profile.

12. The computer program product of claim 11, wherein the operations further comprise:

determine that a value of one of the scores falls within a predefined range that is indicative of an inadequate amount of security; and generate information indicative of one or more suggested actions to increase a value of the determined one of the scores.

13. The computer program product of claim 11, wherein the operations further comprise:

determine a weighted amount to be applied to a score, with the weighted amount specifying an importance of the score relative to others of the scores in generating the digital security score; and applying one or more weighted amounts to one or more of the scores.

14. The computer program product of claim 11, wherein each of the scores is a measure of a strength of one or more of the pre-defined attributes by assigning a value to the pre-defined attribute, and wherein the operations further comprise:

for a score:
  determine which of the pre-defined attributes is evaluated by the score;
  evaluate the determined pre-defined attributes, based on contents of digital personal profile;
  assign a value to each of the pre-defined attributes based on evaluation of the determined pre-defined attributes; and
  generate a value for the score by aggregating the values assigned to the pre-defined attributes for that score.

15. The computer program product of claim 11, wherein the operations further comprise:
  compute the transaction history score;
  compute the personal profile setup score; and
  wherein the generating the digital security score further comprises aggregating the transaction history score and the personal profile setup score.

16. The computer program product of claim 9, wherein the operations further comprise:
  determine that the digital security score is below a threshold value; and
  generate information indicative of one or more suggested actions to increase a value of the digital security score.

17. An electronic system comprising:
  one or more processing devices; and
  one or more machine-readable hardware storage devices storing instructions that are executable by the one or more processing devices to perform operations comprising:
    retrieving, from one or more data repositories, information pertaining to a user, information pertaining the user's system used to access resources, geographic location information, IP address, and MAC address of trusted devices used to connect the user's system to the resources;
    retrieving from a resource activity monitoring system monitoring information pertaining to monitoring of the user's interactions with the resources;
    retrieving information pertaining to user preferences with respect to the resources;
    generating, based on the retrieved user information, a composite digital personal profile that is a composite of a set of pre-defined attributes determined from the retrieved user information, user's system information, information to connect the user's system to the resource, resource activity monitoring and user preferences with respect to the resources;
    determining from a weighted aggregation of the pre-defined attributes
    a digital security score that measures a level of online security of accessing resources over a computer network.

18. The electronic system of claim 17, wherein the operations further comprise:
  receiving update messages from the resource activity monitoring system based on a user's access to the resource; and
  modifying the digital security score by a weighted amount according to the received update messages that is specific to a user for whom the digital security score is generated.

19. The electronic system of claim 17, wherein the digital security score is further based on a transaction history score that is a value indicative of a measure of a user's compliance with a system's rules, and a personal profile setup score that is a value indicative a quality of the user's digital personal profile.

20. The electronic system of claim 19, wherein the operations further comprise:
  determining that a value of one of the scores falls within a predefined range that is indicative of an inadequate amount of security; and
  generating information indicative of one or more suggested actions to increase a value of the determined one of the scores.

21. The electronic system of claim 19, wherein the operations further comprise:
  determining a weighted amount to be applied to a sub-score, with the weighted amount specifying an importance of the sub-score relative to others of the scores in generating the digital security score; and
  applying one or more weighted amounts to one or more of the scores.

22. The electronic system of claim 19, wherein each of the scores is a measure of a strength of one or more of the pre-defined attributes, and the operations further comprise:
  determining which of the pre-defined attributes is evaluated by the score;
  evaluating the determined pre-defined attributes, based on contents of digital personal profile;
  based on evaluating, assigning a value to each of the pre-defined attributes; and
  generating a value for the score by aggregating the values assigned to the pre-defined attributes for that score.

23. The electronic system of claim 19, wherein the operations further comprise:
  computing the transaction history score;
  computing the personal profile setup score; and
  wherein the generating the digital security score further comprises aggregating the transaction history score and the personal profile setup score.

24. The electronic system of claim 17, wherein the operations further comprise:
  determining that the digital security score is below a threshold value; and
  generating information indicative of one or more suggested actions to increase a value of the digital security score.

* * * * *